(12) United States Patent
Mourrier et al.

(10) Patent No.: US 11,710,955 B2
(45) Date of Patent: Jul. 25, 2023

(54) PARAMETER THRESHOLD LEVEL BASED ON SIGNAL FROM CONTROLLER

(71) Applicant: Infineon Technologies AG, Neubiberg (DE)

(72) Inventors: Andre Mourrier, Manosque (FR); Vincent Usseglio, Munich (DE)

(73) Assignee: Infineon Technologies AG, Neubiberg (DE)

( * ) Notice: Subject to any disclaimer, the term of this patent is extended or adjusted under 35 U.S.C. 154(b) by 359 days.

(21) Appl. No.: 17/156,199

(22) Filed: Jan. 22, 2021

(65) Prior Publication Data

US 2022/0239090 A1    Jul. 28, 2022

(51) Int. Cl.
*H02H 3/00* (2006.01)
*H02H 5/04* (2006.01)
*H02H 1/00* (2006.01)

(52) U.S. Cl.
CPC .............. *H02H 3/00* (2013.01); *H02H 1/0007* (2013.01); *H02H 5/04* (2013.01)

(58) Field of Classification Search
None
See application file for complete search history.

(56) References Cited

U.S. PATENT DOCUMENTS

| | | | |
|---|---|---|---|
| 9,979,180 B2 | 5/2018 | Bader et al. | |
| 10,041,839 B2 | 8/2018 | Cortigiani et al. | |
| 10,193,631 B1* | 1/2019 | Chen | G06F 12/1081 |
| 10,256,814 B2 | 4/2019 | Illing et al. | |
| 10,473,711 B2 | 11/2019 | Ladumer et al. | |
| 2009/0080490 A1* | 3/2009 | Mowry, Jr. | G01K 15/005 374/1 |
| 2016/0265828 A1* | 9/2016 | Liu | F04B 49/065 |
| 2022/0209573 A1* | 6/2022 | Choi | H02J 9/062 |

OTHER PUBLICATIONS

Infineon Technologies, "Profet + Current Sense," Rev. 1.1, Mar. 14, 2014, 34 pp.

* cited by examiner

*Primary Examiner* — Stephen W Jackson
(74) *Attorney, Agent, or Firm* — Shumaker & Sieffert, P.A.

(57) ABSTRACT

In some examples, a device includes a memory configured to store a pre-warning threshold level for a parameter of a power switch. The device also includes a logic circuit configured to receive a signal from a controller and set the pre-warning threshold level in response to receiving the signal from the controller. The logic circuit is also configured to determine that a magnitude of the parameter of the power switch does not satisfy the pre-warning threshold level. The logic circuit is further configured to output an alert to the controller in response to determining that the magnitude of the parameter does not satisfy the pre-warning threshold level.

23 Claims, 9 Drawing Sheets

PARAMETER THRESHOLD LEVEL BASED ON SIGNAL FROM CONTROLLER

TECHNICAL FIELD

This disclosure relates to power electronics.

BACKGROUND

A power switch manages the flow of electricity from a power supply to a load. Electrical power flows from the power supply to the load when the power switch is activated by a microcontroller. If the current, voltage, or temperature of the power switch exceeds a safety threshold, the power switch may be damaged. To prevent damage, a logic circuit onboard the power switch device or a logic circuit onboard a gate driver device can monitor these parameters and deactivate its output(s) when one or more of the parameters exceeds a respective safety threshold. The microcontroller will receive a shutdown flag from the power switch, but the microcontroller cannot analyze the reason behind that shutdown flag for learning or even for anticipating the next failure.

SUMMARY

This disclosure describes techniques for setting a pre-warning threshold level for a parameter of a power switch based on a signal sent from a controller to a logic circuit in the power switch device or in a gate driver device. The logic circuit can apply the pre-warning threshold, as well as apply a shutdown level for deactivating the power switch. The logic circuit may be configured to also set the pre-warning threshold level based on the signal received from the controller. The logic circuit is also configured to monitor parameter values of the power switch, where the parameters may include current, voltage, and/or temperature.

The techniques of this disclosure may allow for reduced data flow along a communication channel between a controller and a logic circuit in a power switch device or in a gate driver device. The controller may be able to monitor and control numerous devices where each device communicates only alerts to the controller, rather than continuously transmitting parameter values to the controller.

In some examples, a device includes memory configured to store a pre-warning threshold level for a parameter of a power switch. The device also includes a logic circuit configured to receive a signal from a controller and set the pre-warning threshold level in response to receiving the signal from the controller. The logic circuit is also configured to determine that a magnitude of the parameter of the power switch does not satisfy the pre-warning threshold level. The logic circuit is further configured to output an alert to the controller in response to determining that the magnitude of the parameter does not satisfy the pre-warning threshold level.

In some examples, a method includes storing, by a logic circuit to a memory, a pre-warning threshold level for a parameter of a power switch. The method also includes receiving, by the logic circuit, a signal from a controller and setting, by the logic circuit, the pre-warning threshold level in response to receiving the signal from the controller. The method further includes determining, by the logic circuit, that a magnitude of the parameter of the power switch does not satisfy the pre-warning threshold level. The method includes outputting, by the logic circuit, an alert to the controller in response to determining that the magnitude of the parameter does not satisfy the pre-warning threshold level.

In some examples, a system including a power device configured to control a power switch, the power device including a logic circuit and a memory configured to store a pre-warning threshold level for a parameter of the power switch. The system also includes a microcontroller configured to transmit a signal to the power device instructing the logic circuit to set the pre-warning threshold level. The logic circuit is configured to set the pre-warning threshold level in response to receiving the signal from the microcontroller. The logic circuit is also configured to determine that a magnitude of the parameter of the power switch does not satisfy the pre-warning threshold level. The logic circuit is further configured to output an alert to the microcontroller in response to determining that the magnitude of the parameter does not satisfy the pre-warning threshold level.

The details of one or more examples are set forth in the accompanying drawings and the description below. Other features, objects, and advantages will be apparent from the description and drawings, and from the claims.

DETAILED DESCRIPTION

This disclosure describes devices, methods, and techniques for locally monitoring several power devices parameters to ensure that the parameters stay within an acceptable range. A power switch device or a gate driver device can monitor whether each parameter satisfies a respective pre-warning threshold. In response to determining that a parameter does not satisfy a respective pre-warning threshold level, the device may be configured to output an alert to a controller. In some examples, the device may be configured to refrain from outputting the alert in response to determining that the parameter satisfies the respective pre-warning threshold level.

Figure 1:
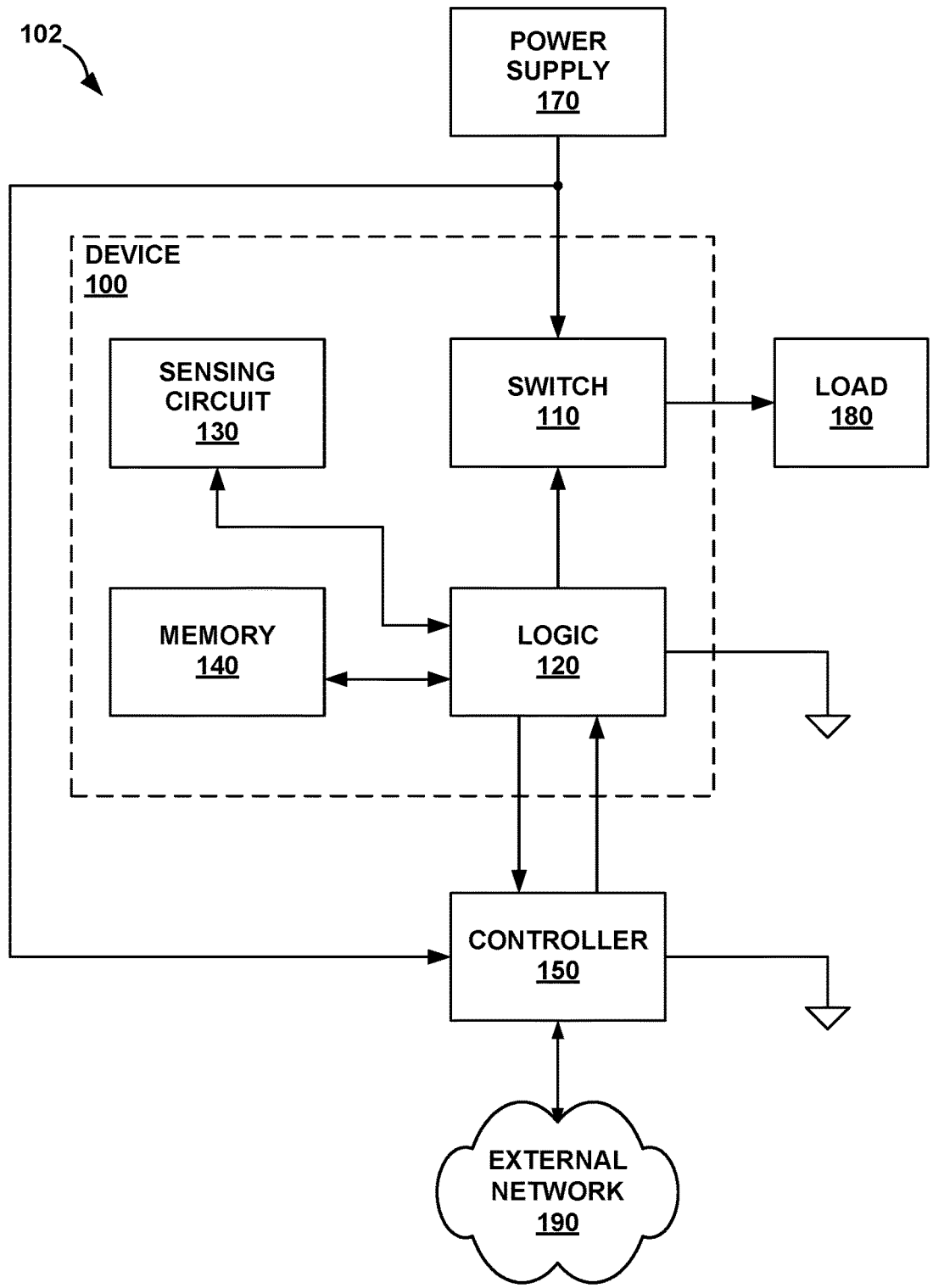
FIG. 1 is a conceptual block diagram of a system including a power switch device and a controller, in accordance with the techniques of this disclosure.

FIG. 1 is a conceptual block diagram of a system 102 including a power switch device 100 and a controller 150, in accordance with the techniques of this disclosure. System 102 includes device 100, controller 150, power supply 170, load 180, and external network 190. Although not shown in FIG. 1, system 102 may also include additional components such as a gate driver and/or one or more printed circuit boards (PCBs), where device 100 and controller 150 may be mounted to the same PCB or different PCBs.

Device 100 includes switch 110, logic 120, sensing circuit 130, and memory 140 in the example shown in FIG. 1. Device 100 may also include a gate driver connected between switch 110 and logic 120, where the gate driver is configured to amplify control signals generated by logic 120 and deliver the amplified signals to switch 110. Device 100 may include a housing that at least partially encloses switch 110, logic 120, sensing circuit 130, memory 140, and/or a gate driver. In some examples, device 100 includes a single semiconductor die, where switch 110, logic 120, sensing circuit 130, memory 140, and/or a gate driver are integrated on the single semiconductor die. Even if switch 110, logic 120, sensing circuit 130, memory 140, and/or gate driver are integrated on more than one semiconductor die, switch 110, logic 120, sensing circuit 130, memory 140, and/or a gate driver may be integrated into a single package.

Other arrangements are possible including a single package, a single housing, and/or a single semiconductor die including a gate driver and logic 120, where switch 110 is external to the single package, single housing, or single semiconductor die. Memory 140 may be integrated into the single package, single housing, or single semiconductor die, or memory 140 may be external to and interfaced with the single package, single housing, or single semiconductor die.

Switch 110 may be configured to deliver power from power supply 170 to load 180. In examples in which switch 110 is connected as a high-side switch, switch 110 can deliver power to load 180 when switch 110 is activated and can block the flow of power when switch 110 is deactivated. When switch 110 is activated, load 180 may be electrically connected to power supply 170 through switch 110.

Switch 110 may include, but is not limited to, any type of field-effect transistor (FET) such as a diffusion metal-oxide-semiconductor FET (MOSFET), a bipolar junction transistor (BJT), an insulated-gate bipolar transistor (IGBT), a high-electron-mobility transistor (HEMT), and/or another element that uses voltage for its control. Switch 110 may include n-type transistors and/or p-type transistors. Switch 110 may include semiconductor material such as silicon, silicon carbide, and/or gallium nitride. In some examples, switch 110 may include a plurality of transistors connected in parallel between power supply 170 and load 180.

Logic 120 may be configured to communicate with controller 150. For example, logic 120 may be configured to set a pre-warning threshold level in response to a signal received from controller 150. Logic 120 may be configured to output data to controller 150, where the data may indicate the condition of switch 110. Logic 120 can output, to controller 150, an alert indicating that a signal received from sensing circuit 130 does not satisfy a pre-warning threshold level. The alert may communicate to controller 150 that an operating parameter of switch 110 is nearing a shutdown level.

In standard operation, logic 120 may be configured to refrain from communicating parameter values to controller 150, where the each parameter value indicates a magnitude of a signal outputted by sensing circuit 130. Logic 120 may be configured to begin communicating parameter values to controller 150 in response to a request received from controller 150. Additionally or alternatively, logic 120 may be configured to begin communicating values for a parameter of switch 110 to controller 150 after outputting an alert indicating that the parameter does not satisfy a pre-warning threshold level. This configuration may allow controller 150 to conduct in-depth monitoring of the parameter values only when circumstances warrant such monitoring.

Sensing circuit 130 may be configured to generate a signal indicating a parameter of switch 110. In some examples, sensing circuit 130 may include a plurality of sensors, where each sensor is configured to generate a signal indicating a respective parameter of switch 110. Example parameters include temperature (e.g., absolute temperature or change in temperature), voltage, current (e.g., creepage current or leakage current), mechanical strength, and other parameters. Logic 120 may be configured to monitor the parameters of switch 110 without sending the parameter values off-chip (e.g., to controller), except when controller 150 requests parameter values or after logic 120 outputs an alert to controller 150.

Memory 140 may be configured to store one or more threshold levels for monitoring the parameters of switch 110. For example, memory 140 may be configured to store one or more pre-warning threshold levels indicating that switch 110 is still within a safe operating range but nearing shutdown levels. Memory 140 may be configured to also store one or more shutdown levels for deactivating switch 110 to prevent damage to switch 110. In addition, memory 140 may be configured to store one or more maximum device threshold levels that represent that outer limits outside of which the shutdown levels cannot be programmed.

Controller 150 may include a microcontroller configured to communicate with device 100. Controller 150 may include processing circuitry, memory, and/or communication interface. Controller 150 may include a first semiconductor die, and device 100 may include a second semiconductor die, where the first semiconductor die is separate from the second semiconductor die. In some examples, device 100 and controller 150 may be mounted on the same PCB or mounted on different PCBs.

Power supply 170 may be configured to deliver power to device 100 and controller 150. Although FIG. 1 depicts device 100 and controller 150 as receiving power from the same power supply 170, device 100 and controller 150 may receive power from different supplies in some examples. Power supply 170 may include an energy storage device such as a battery, mains power, and/or any other power source. In the context of an automotive system, power supply 170 may include a twelve-volt battery and/or a 48-volt battery. In some examples, system 102 may include a power converter connected between power supply 170 and switch 110, where the power converter may include a DC/DC step-down converter.

Load 180 may include a resistive load, a capacitive load, and/or an inductive load. Examples of inductive loads may include actuators, motors, and pumps used in one or more of heating, air conditioning, water supply, a fan, or other systems that include inductive loads. Examples of capacitive loads may include lighting elements. In yet other examples, load 180 may be a combination of resistive, inductive and capacitive loads. In automotive applications, load 180 may include a braking system, a steering system, an autonomous driving system, and/or a driver-assistance system.

An existing controller that receives a shutdown flag from a power switch may not be able to determine the event that precipitated the shutdown. Even if the existing controller is able to determine the event that precipitated the shutdown, the controller may not have received any indication that the switch was approaching shutdown before receiving the shutdown flag. Thus, the existing controller could not have predicted the shutdown or diagnosed the issue before the shutdown. Moreover, the existing controller cannot determine how many other switches have experienced similar issues unless those switches have shutdown.

In accordance with the techniques of this disclosure, logic 120 may be configured to output an alert to controller 150 in response to determining that a magnitude of a signal received from sensing circuit 130 does not satisfy a pre-warning threshold level stored in memory 140. The pre-warning threshold level may be within an operating range of switch 110 such that the signal received from sensing circuit 130 will cross the pre-warning threshold level before reaching a shutdown level. After outputting the alert, logic 120 may be configured to begin sending indications of the parameters of switch 110 to controller 150, either in response to a request from controller 150 or without needing to receive a request from controller.

Logic 120 may be configured to refrain from sending an alert or any parameter values to controller 150 in response to determining that the magnitude of a signal received from sensing circuit 130 satisfies the pre-warning threshold level stored in memory 140. Logic 120 may not communicate any information about parameter values to controller 150 to reduce the workload of controller 150 because controller 150 may be responsible for numerous devices in system 102.

Controller 150 may be configured to send a signal to device 100 instructing logic 120 to set a pre-warning threshold level. Controller 150 may be configured to send such a signal at startup of system 102 (e.g., when an automobile powers on) because the volatile memory onboard device 100 may erase data when device 100 powers off. Controller 150 may be configured to determine a magnitude for the pre-warning threshold level based on a value stored to a memory onboard controller 150 and/or based on communication from external network 190.

Controller 150 may be configured to request that logic 120 begin sending indications of the parameters of switch 110 to controller 150. Thus, controller 150 can begin actively monitoring parameter values of switch 110 in response to receiving the alert from device 100. In addition, controller 150 may be configured to store an indication of the alert received from device 100. Controller 150 may be configured to also store indications of alerts from other devices in system 102 that are coupled to controller 150. Controller 150 can forward the alert(s) to external network 190 for data analysis by a fleet manager. Additionally or alternatively, controller 150 may be configured to perform the data analysis on-chip, for example, by changing the threshold levels in response to a threshold level has not been crossed or that a threshold level has been crossed several times.

In response to determining a threshold level has not been crossed, controller 150 may be configured to shrink the pre-warning threshold level (e.g., increase a lower threshold or decrease an upper threshold). In response to determining a threshold level has been crossed more than a particular number of times, either by device 100 or by multiple devices in system 102, controller 150 may be configured to expand the pre-warning threshold level. The determination of whether to shrink or expand a threshold level may be based on the magnitude difference between the pre-warning threshold level and the corresponding shutdown level. For example, controller 150 may be configured to determine whether to shrink an upper temperature pre-warning threshold level based on a magnitude difference between that threshold level and an upper temperature shutdown level.

External network 190 may include a cloud network for managing a fleet of systems including system 102. The fleet manager may receive alerts from multiple systems that each include a respective controller and a respective power device, where each system may be mounted on a vehicle in the fleet. The fleet manager may be able to view and compare the alerts outputted by controllers across the fleet via external network 190. For example, controller 150 may be configured to receive alerts from devices in system 102 such as device 100 and send the alerts to external network 190.

Figure 2:
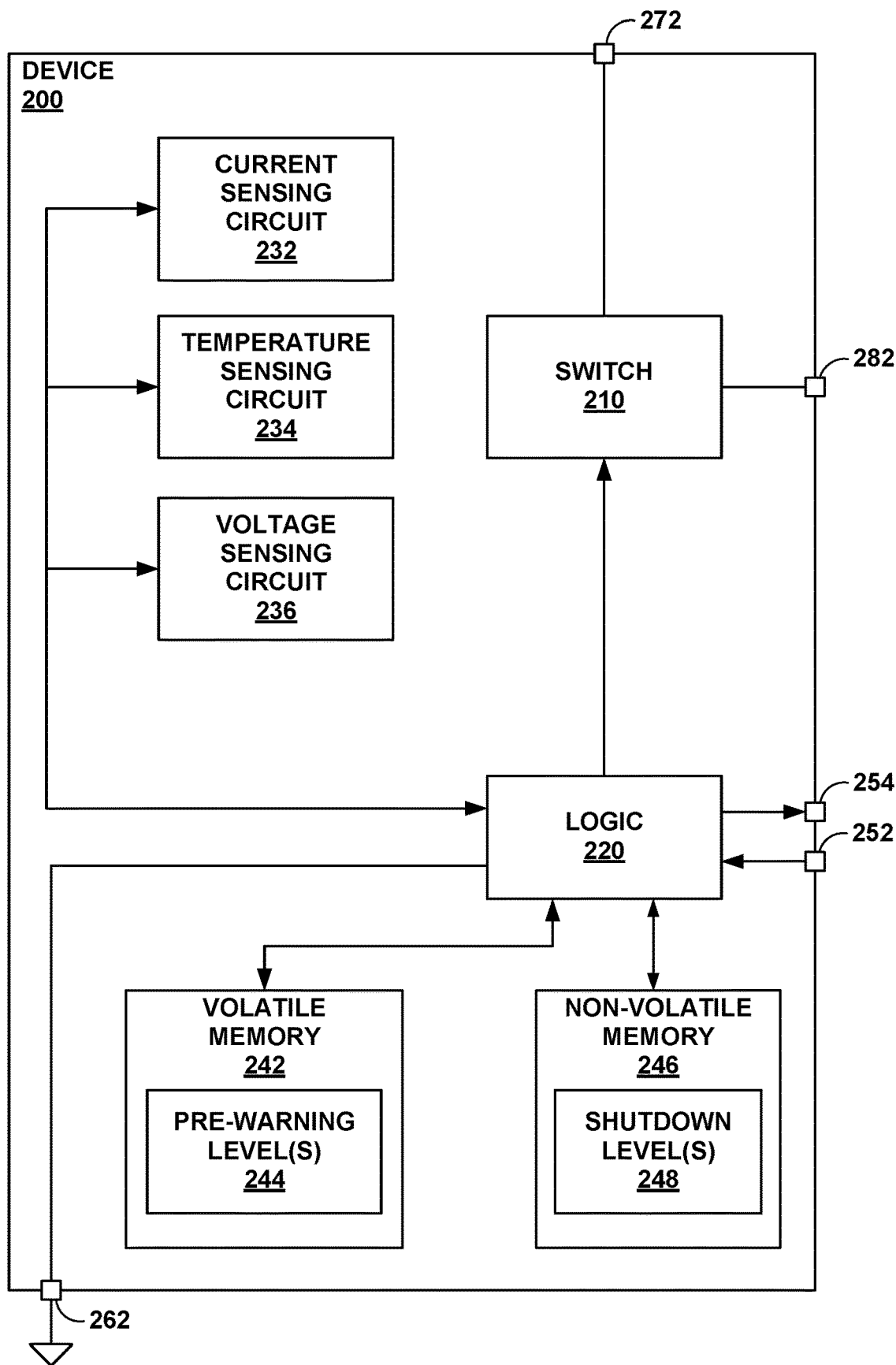
FIG. 2 is a conceptual block diagram of a power switch device including a switch, a logic circuit, and memory, in accordance with the techniques of this disclosure.

FIG. 2 is a conceptual block diagram of a power switch device 200 including a switch 210, a logic 220, and memory 242 and 246, in accordance with the techniques of this disclosure. Device 200 also includes sensing circuits 232, 234, and 236 and interfaces 252, 254, 262, 272, and 282. Interfaces 252 and 254 may be digital interfaces for communication with a controller, such as serial peripheral interface and/or universal asynchronous receiver-transmitter.

Switch 210 may be configured to deliver power from interface 272 to interface 282 depending on whether switch 210 is activated or deactivated. Switch 210 can activate or deactivate based on a control signal received from logic 220. Although not shown in FIG. 2, device 200 may include a gate driver connected between switch 210 and logic 220, where the gate driver is configured to amplify the control signals outputted by logic 220 and deliver the amplified signals to a control terminal of switch 210.

Logic 220 may be configured to communicate with an external device such as a controller via interfaces 252 and 254. For example, logic 220 may receive a signal from a controller via interface 252, where the signal indicates a new pre-warning threshold level to be stored to volatile memory 242. Logic 220 may be configured to output an alert or other information to an external device via interface 254. Logic 220 may be configured to also receive power from interfaces 262 and 272, where interface 262 may be connected to a reference voltage supply, and interface 272 may be connected to a high-side power supply.

Sensing circuits 232, 234, 236 are configured to sense the current, temperature, and voltage of switch 210, respectively. Current sensing circuit 232 may be configured to sense the current conducted by switch 210 from interface 272 to interface 282. Temperature sensing circuit 234 may be configured to sense the temperature of switch 210. Voltage sensing circuit 236 may be configured to sense the voltage across switch 210 (e.g., the voltage difference between interfaces 272 and 282).

In some examples, device 200 only includes one or two of sensing circuits 232, 234, 236 (e.g., only sensing circuits 232 and 234). In some examples, device 200 includes additional sensing circuits not shown in FIG. 2. For example, device 200 may include a circuit for sensing electromagnetic energy generated by switch 210. Current sensing circuits 232 and 236 may include a current mirror, a shunt resistor, a magnetic sensor, and/or any other current or voltage sensor. Temperature sensing circuit 234 may include a temperature-dependent circuit element (such as a temperature-dependent resistor, bipolar junction transistor, diode or other circuit element that operates with temperature dependence), an analog-to-digital converter, a bandgap reference sensor, negative temperature coefficient element, and/or any other type of temperature sensor.

Volatile memory 242 may be configured to store pre-warning threshold level(s) 244. For example, pre-warning thresholds level 244 may include an upper threshold level and/or a lower threshold level for a parameter such as temperature, current, or voltage. In some examples, there may be six pre-warning thresholds level 244 stored to volatile memory 242 (e.g., an upper and a lower threshold level for each of three parameters). In response to determining that a parameter value satisfies the upper and lower threshold levels, logic 220 may be configured to refrain from generating an alert.

Non-volatile memory 246 may be configured to store shutdown level(s) 248. For example, shutdown levels 248 for temperature may include an upper shutdown level and/or a lower shutdown level. In some examples, there may be six shutdown levels 248 stored to non-volatile memory 246 (e.g., an upper and a lower threshold level for each of three parameters). In response to determining that a parameter value does not satisfy shutdown level 248, logic 220 may be configured to deactivate switch 210. Non-volatile memory 246 may include memory that can be programmed multiple times because it may be desirable to change the value of shutdown level(s) 248. Logic 220 may be configured to set a shutdown level based on a command received from a controller via interface 252.

Non-volatile memory 246 may be configured to also store device rating threshold levels that are predefined and/or fixed throughout the lifetime of device 200. The device rating threshold levels may represent the minimum or maximum parameter values that switch 210 can withstand, as determined by the manufacturer. In some examples, logic 220 cannot change the device rating threshold levels stored to non-volatile memory 246. Logic 220 may be configured to deactivate switch 210 in response to determining that a parameter value does not satisfy a device rating threshold level.

Figure 3:
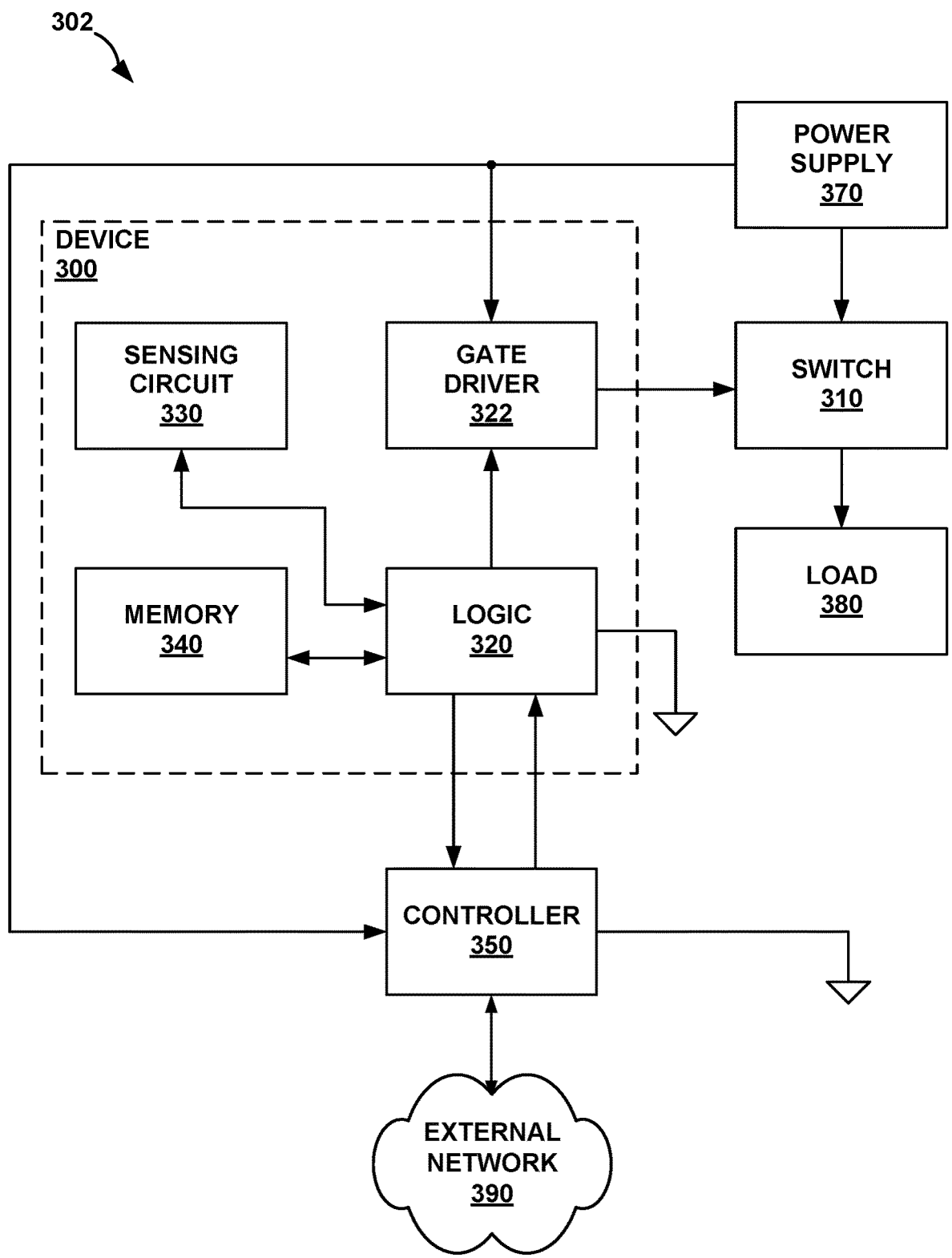
FIG. 3 is a conceptual block diagram of a system including a gate driver device configured to control a power switch, in accordance with the techniques of this disclosure.

FIG. 3 is a conceptual block diagram of a system including a gate driver device configured to control a power switch, in accordance with the techniques of this disclosure. Logic 320 may be configured to perform any of the techniques described with respect to logic 120 and 220 shown in FIGS. 1 and 2. For example, logic 320 may be configured to store a pre-warning threshold level to memory 340 based on a signal received from microcontroller 350. Logic 320 may be configured to also output an alert to microcontroller 350 in response to determining that a magnitude of a parameter of switch 310 does not satisfy the pre-warning threshold level.

Logic 320 may be configured to generate and deliver control signals to gate driver 322. Gate driver 322 can amplify the control signals received from logic 320 and deliver the amplified signals to the control terminal of switch 310 to activate or deactivate switch 310. In the example shown in FIG. 3, switch 310 is external to device 300, but an integrated device including a switch, a gate driver, and a logic circuit could also be configured to perform the techniques of this disclosure.

In some examples, logic 320, gate driver 322, sensing circuit 330, and memory 340 may be at least partially enclosed by a single housing. Additionally or alternatively, logic 320, gate driver 322, sensing circuit 330, and memory 340 may be integrated on a single semiconductor die. Logic 320, gate driver 322, sensing circuit 330, and memory 340 may be integrated into a single package.

Figure 4:
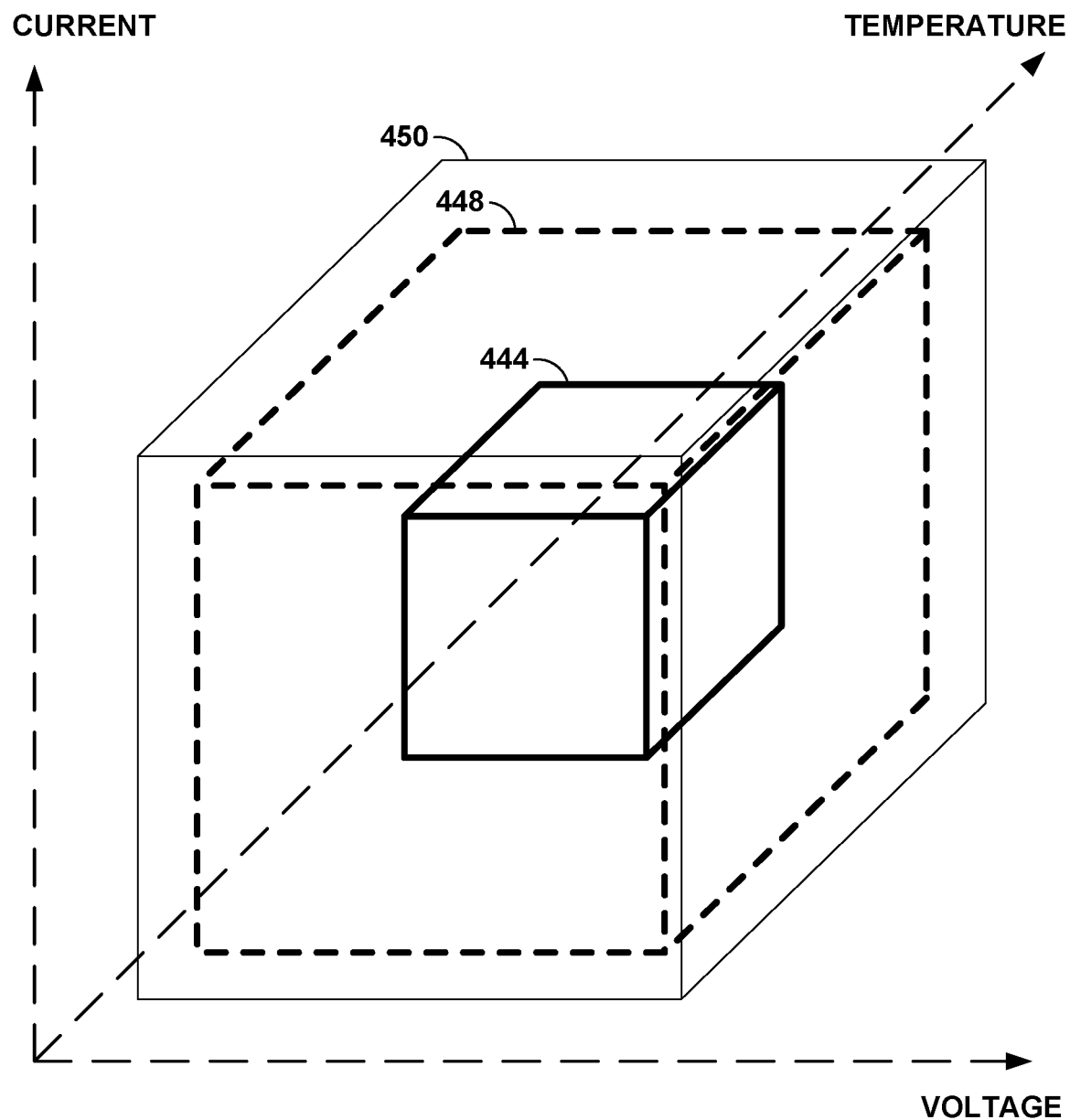
FIG. 4 is a conceptual diagram of threshold levels for three example parameters of a power switch, in accordance with the techniques of this disclosure.

FIG. 4 is a conceptual diagram of threshold levels for three example parameters of a power switch, in accordance with the techniques of this disclosure. Although FIG. 4 depicts upper and lower threshold levels for each parameter for each of cubes 444, 448, and 450, there may be a single threshold level for a parameter in some examples. Outermost cube 450 represents a device rating for each parameter, which may be fixed throughout the lifetime of a power switch. For example, the logic circuit may be configured to deactivate the power switch when a parameter does not satisfy the limits of outermost cube 450 regardless of the threshold levels stored in memory.

Middle cube 448 illustrated by the thick dotted line represents the shutdown levels for each parameter. For example, the logic circuit may be configured to deactivate the power switch when a parameter does not satisfy the shutdown levels. The shutdown levels are stored in non-volatile memory, but the logic circuit may be configured to set or adjust the shutdown levels based on a signal received from a controller.

Inner cube 444 illustrated by the thick solid line represents the pre-warning threshold levels for each parameter. For example, the logic circuit may be configured to output an alert when a parameter does not satisfy the pre-warning threshold levels. The pre-warning threshold levels are stored in volatile memory, and the logic circuit may be configured to set the pre-warning threshold levels based on a signal received from a controller. The logic circuit may be configured to set the pre-warning threshold levels after each power cycle because the volatile memory does not store the pre-warning threshold levels when the power is off.

Each set of upper and lower threshold levels can form an acceptable range for parameter values. For example, an acceptable pre-warning range for temperature may be between a lower threshold (e.g., zero degrees Celsius) and an upper threshold (e.g., seventy degrees Celsius). The device may be configured to generate an alert in response to determining that the temperature of the switch is outside of the acceptable pre-warning range. The shutdown range for temperature may be more extensive than the acceptable pre-warning range (e.g., negative ten degrees to eighty degrees Celsius). There may also be a threshold level for the change in temperature over time and/or a threshold level for the temperature differential between two locations on the device. A temperature differential between two locations on the device may result in mechanical stress caused by different thermal expansion at the two locations. Thus, there may be a threshold level of five, ten, fifteen, twenty, or thirty Kelvin for the differential between the temperature sensed at two points on the device.

A fleet manager may be able to command devices and/or controllers in the fleet to set or change threshold levels for cubes 444 and 448 by sending instruction(s) through an external network. The shutdown levels for cube 448 may be set at the time of manufacture, but the fleet manager or controller may be able to change the shutdown levels during operation of the device.

FIGS. 5A-7B are diagrams of sensed parameters for vehicle fleets, in accordance with the techniques of this disclosure. In the example shown in FIG. 5A, none of the vehicles have generated an alert due to pre-warning threshold level 500A or 510A being crossed. In response to determining that no alerts have been generated or that the number of alerts is smaller than a threshold number, a fleet manager can shrink or constrict the range associated with pre-warning threshold levels 500B and 510B for the three parameters, as shown in FIG. 5B. The fleet manager can decrease the upper temperature pre-warning threshold 510B away from the upper temperature shutdown level 530B. Similarly, the fleet manager can increase the upper temperature pre-warning threshold level 500B away from the lower temperature shutdown level 520B. The fleet manager may be able to set a threshold level for multiple devices in a system by sending a single command or a copy of the same command to each device in the system.

Additionally or alternatively, a controller in one of the fleet systems may be configured to shrink or constrict a pre-warning threshold range in response to determining that the controller has not received an alert from any of the devices that are coupled to the controller, even if the controller has not received any command from the fleet manager. The controller may be configured to shrink (e.g., reduce or decrease) the pre-warning threshold range in response to determining that a predetermined time duration has elapsed without receiving any alerts from the devices.

Figure 5A:
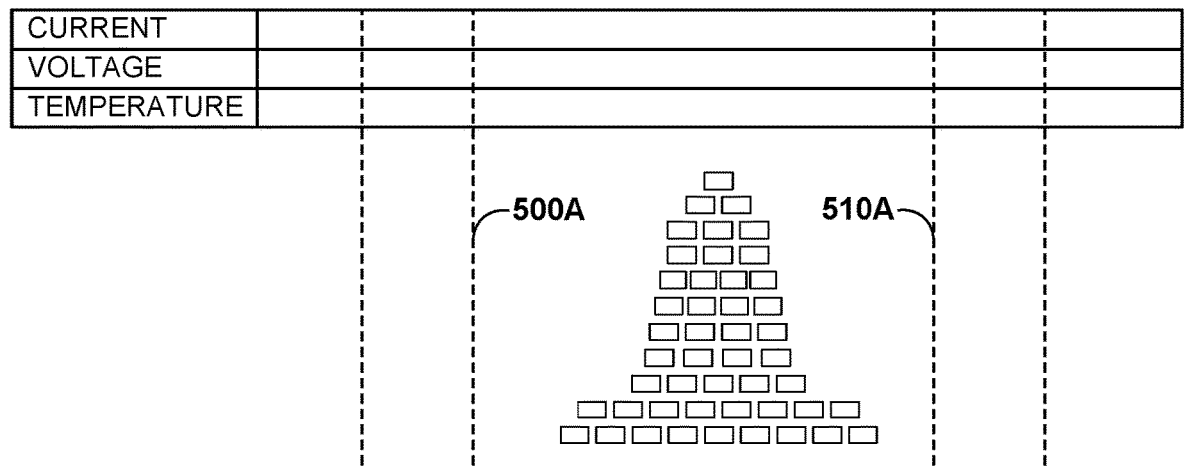
FIGS. 5A-7B are diagrams of sensed parameters for vehicle fleets, in accordance with the techniques of this disclosure.
Figure 5B:
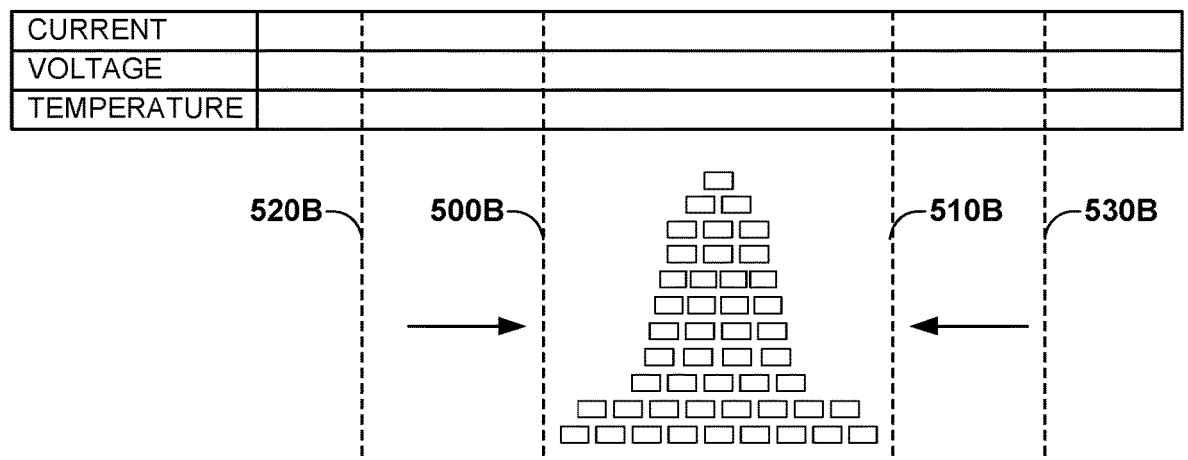

The working area for the three parameters is defined by the pre-warning threshold levels 500A and 510A shown in FIG. 5A. This working area may be overdesigned relative to the actual fleet performance because no information is sent back to the fleet manager in the form of alerts generated due to breached thresholds. Pre-warning threshold levels 500B and 510B shown in FIG. 5B may be optimized relative to the pre-warning threshold levels shown in FIG. 5A because there is a greater likelihood that a device in the fleet may cross pre-warning threshold level 500B or 510B, which results in the fleet manager receiving information about the performance of the fleet. The fleet manager can readjust pre-warning threshold levels for better margin evaluation because none of the devices in the fleet shown in FIG. 5A generated an alert.

Figure 6A:
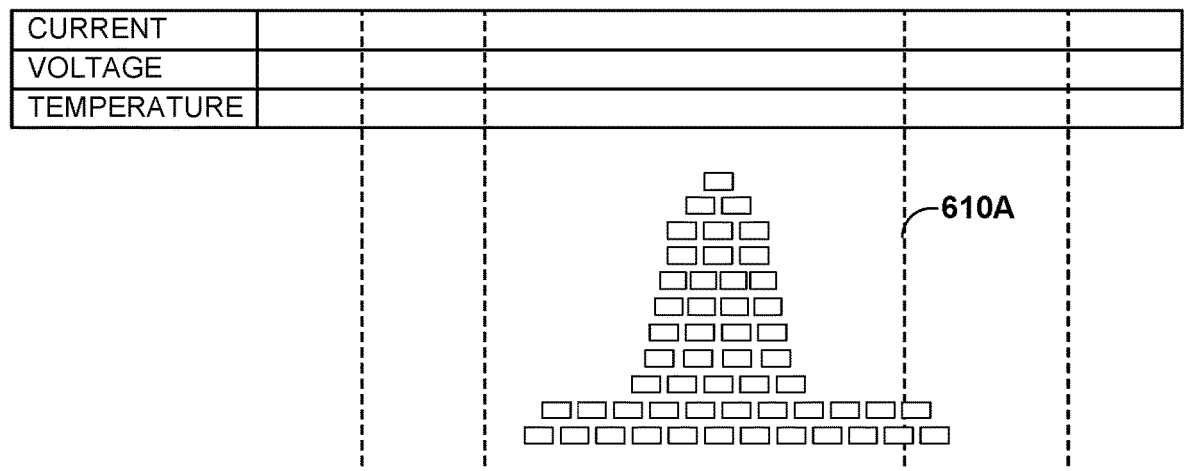
Figure 6B:
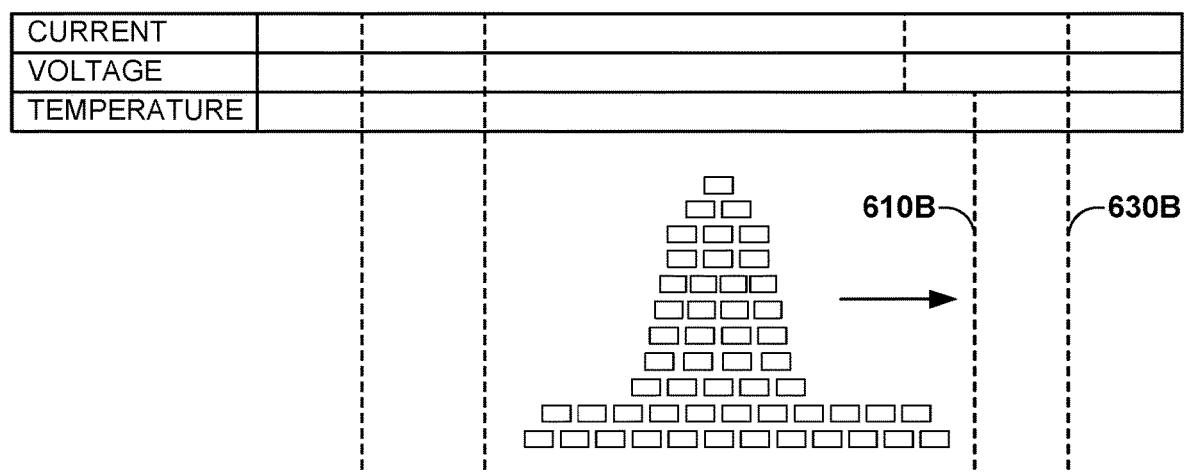

In the example shown in FIG. 6A, a small percentage of the vehicles have generated an alert due to the temperature having breached pre-warning threshold level 610A. In response to determining that temperature alerts have been generated or that the number of temperature alerts is greater than a threshold number, a fleet manager can expand the pre-warning threshold that has been crossed (e.g., upper temperature threshold level 610B), as shown in FIG. 6B. If the number of alerts is less than a threshold number, it may indicate that one or two devices have a soldering problem, rather than a fleetwide issue. The fleet manager can expand the upper temperature pre-warning threshold level 610B towards the upper temperature shutdown level 630B, but upper temperature pre-warning threshold level 610B is still less than the upper temperature shutdown level 630B. The fleet manager may not change the other five pre-warning threshold levels in examples in which only pre-warning threshold level 610A has been crossed.

The temperature working area shown in FIG. 6A may have been designed for regular temperature operating conditions. However, the working area should be expanded for operations in some regions. For example, a fleet of vehicles in Saudi Arabia will likely experience higher operating temperatures, as compared to a fleet of vehicles in Germany or Great Britain. Thus, the working area should be expanded for hot climates by increasing the magnitude of upper temperature pre-warning threshold level 610A.

Figure 7A:
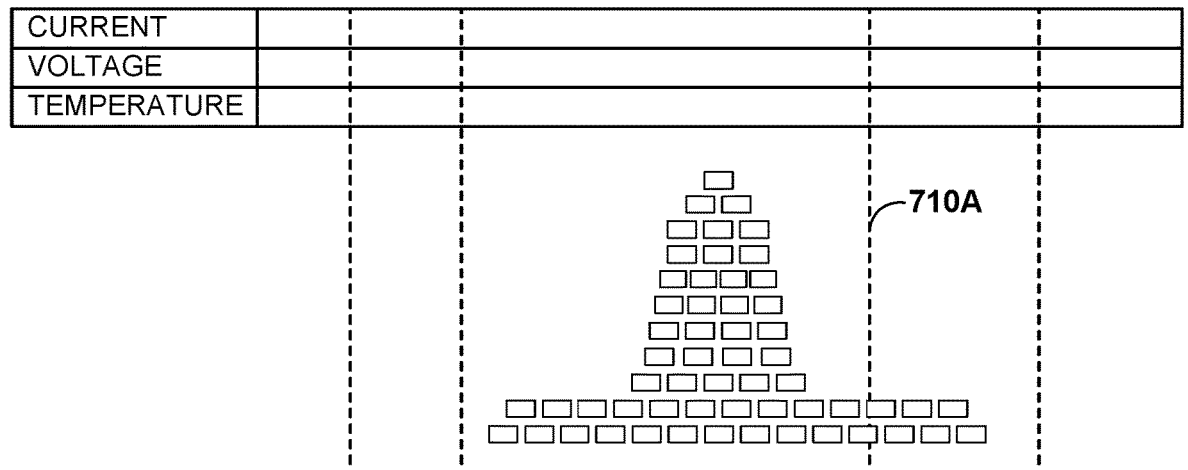
Figure 7B:
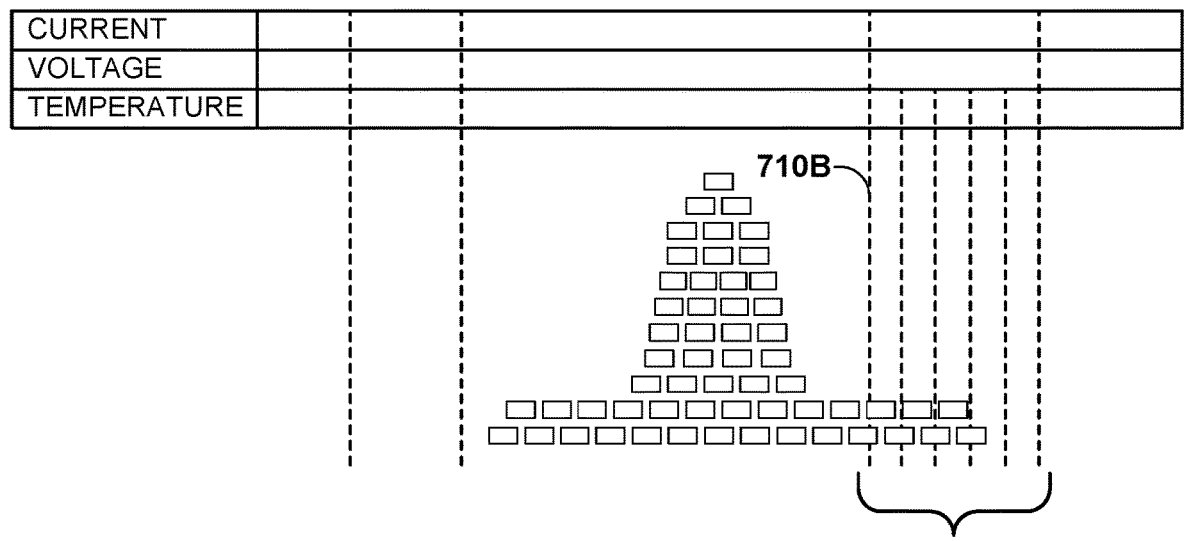

In the example shown in FIG. 7A, a percentage of the vehicles have generated an alert due to temperature crossing pre-warning threshold level 710A, where the percentage of alerting vehicles in FIG. 7A is larger than the percentage of alerting vehicles in FIG. 6A. In response to receiving temperature alerts or determining that the number of temperature alerts is greater than a threshold number, a fleet manager can expand the pre-warning threshold level that has been crossed (e.g., the upper temperature threshold level 710A), as shown in FIG. 7B. FIG. 7B shows that the fleet manager may increase the upper temperature threshold level by a plurality of increments 712B. Additionally or alternatively, the fleet manager may cause each device in the fleet to implement a plurality of upper threshold pre-warning threshold levels. Incremental threshold levels may allow for better margin analysis of the extent that each parameter value is exceeding the pre-warning threshold level.

Returning to FIG. 1, a fleet manager can receive data indicating the number and type of alerts generated by the devices in a fleet from controller 150 and other controllers via external network 190. Based on an analysis of the alert data, a fleet manager can change a pre-warning threshold level by transmitting an indication of the new threshold level to controller 150 via external network 190. Thus, the fleet manager and command controller 150 to shrink or expand the boundaries one or more of cubes 444 and 448.

In some examples, the boundaries of cube 450 may be static and predefined because the boundaries of cube 450 represent the device rating (e.g., the maximum threshold levels for parameters of switch 110). If a boundary of cube 444 or 448 extends beyond a boundary of cube 450, logic 120 may be configured to deactivate switch 110 when a parameter value reaches the boundary of cube 450 before reaching the respective boundary of cube 444 or 448. Thus, controller 150 may be configured to deactivate switch 110 before the parameter value can reach a boundary of cube 444 or 448 that extends beyond a boundary of cube 450.

Figure 8:
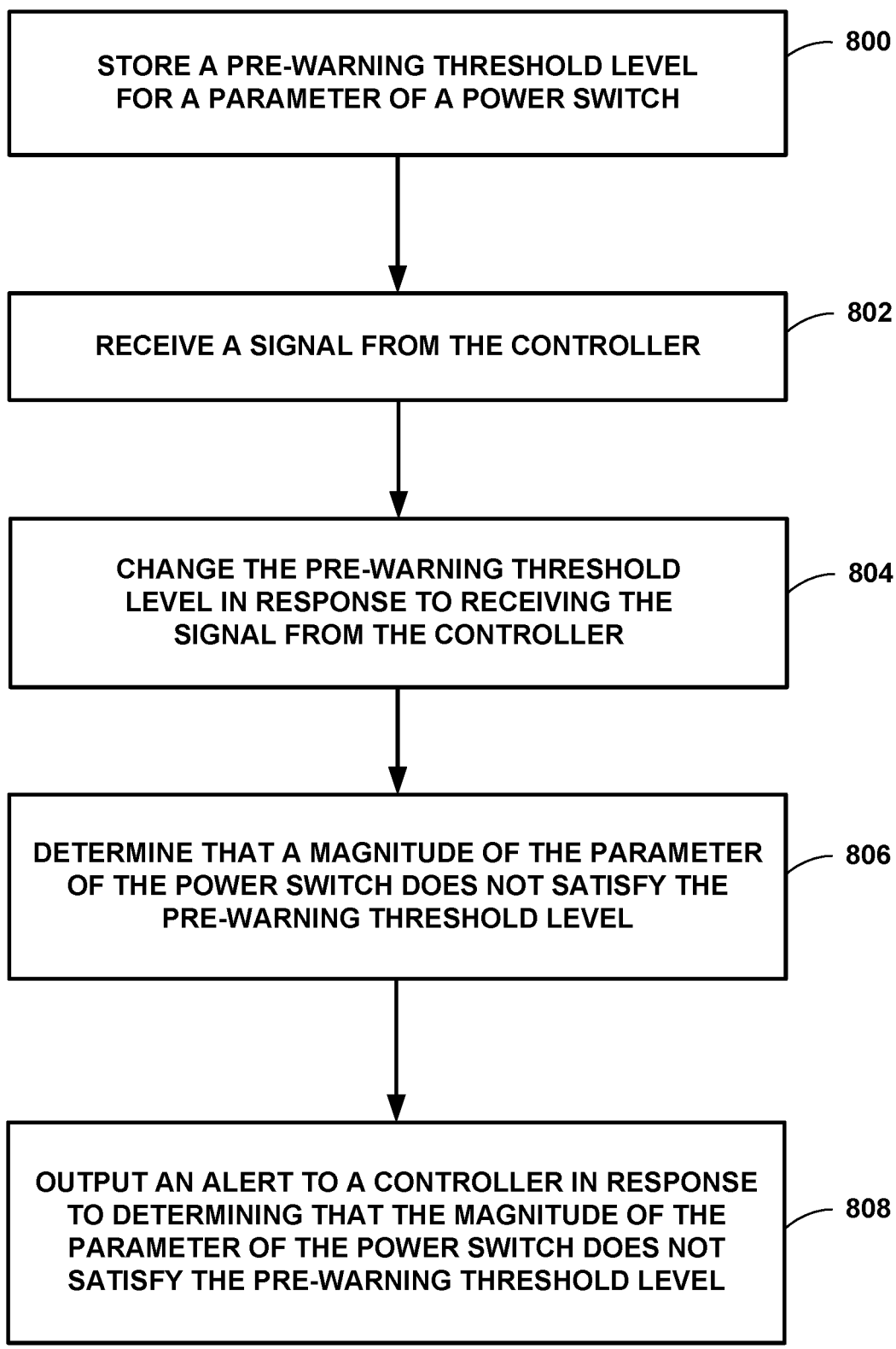
FIG. 8 is a flow diagram illustrating example techniques for setting a pre-warning threshold level in response to receiving a signal from a controller, in accordance with the techniques of this disclosure.

FIG. 8 is a flow diagram illustrating example techniques for setting a pre-warning threshold level in response to receiving a signal from a controller, in accordance with the techniques of this disclosure. Device 200 shown in FIG. 2 will be described as performing the techniques of the example shown in FIG. 8, but other components, devices, and systems (e.g., device 100) may perform similar functionality in other examples.

In the example of FIG. 8, logic 220 stores pre-warning threshold level 244 for a parameter of switch 210 to volatile memory 242 (800). Logic 220 then receives a signal from a controller via interface 252 (802). The signal received via interface 252 may indicate a new value for pre-warning threshold level 244. Logic 220 sets a new value for pre-warning threshold level 244 in response to receiving the signal from the controller (804). The previous value for pre-warning threshold level 244 may have been erased during a power cycle, or logic 220 may overwrite the previous value for pre-warning threshold level 244 during operation.

Logic 220 determines that a magnitude of the parameter of switch 210 does not satisfy pre-warning threshold level 244 (806). For example, logic 220 can make this determination by determining that a magnitude of a signal received from one of sensing circuits 232, 234, and 236 is greater than an upper threshold level or is less than a lower threshold level. Likewise, logic 220 may be configured to determine that a parameter value satisfies a threshold level by determining that the parameter value is within an acceptable range. Logic 220 may be configured to determine that a parameter value satisfies a threshold level by determining that the parameter value is greater than a lower threshold level and/or less than an upper threshold level.

Logic 220 outputs an alert to the controller via interface 254 in response to determining that the magnitude of the parameter does not satisfy pre-warning threshold level 244 (808). The alert may include a flag and/or one or more bits that are transmitted by device 200 to the controller. The alert may also include data indicating the time at which logic 220 determined that the parameter value did not satisfy pre-warning threshold level 244. The alert data can also indicate the magnitude of the parameter value and the threshold level that was crossed.

Logic 220 may be configured to generate an alert for each threshold level crossed by a parameter value. For example, logic 220 may be configured to generate a first alert in response to determining that a magnitude of an electrical current through switch 210 does not satisfy a current pre-warning threshold level. Logic 220 may be configured to generate a second alert in response to determining that a magnitude of a temperature of switch 210 does not satisfy a temperature pre-warning threshold level. Logic 220 may be configured to generate a third alert in response to determining that a magnitude of a voltage across switch 210 does not satisfy a voltage pre-warning threshold level.

Figure 9:
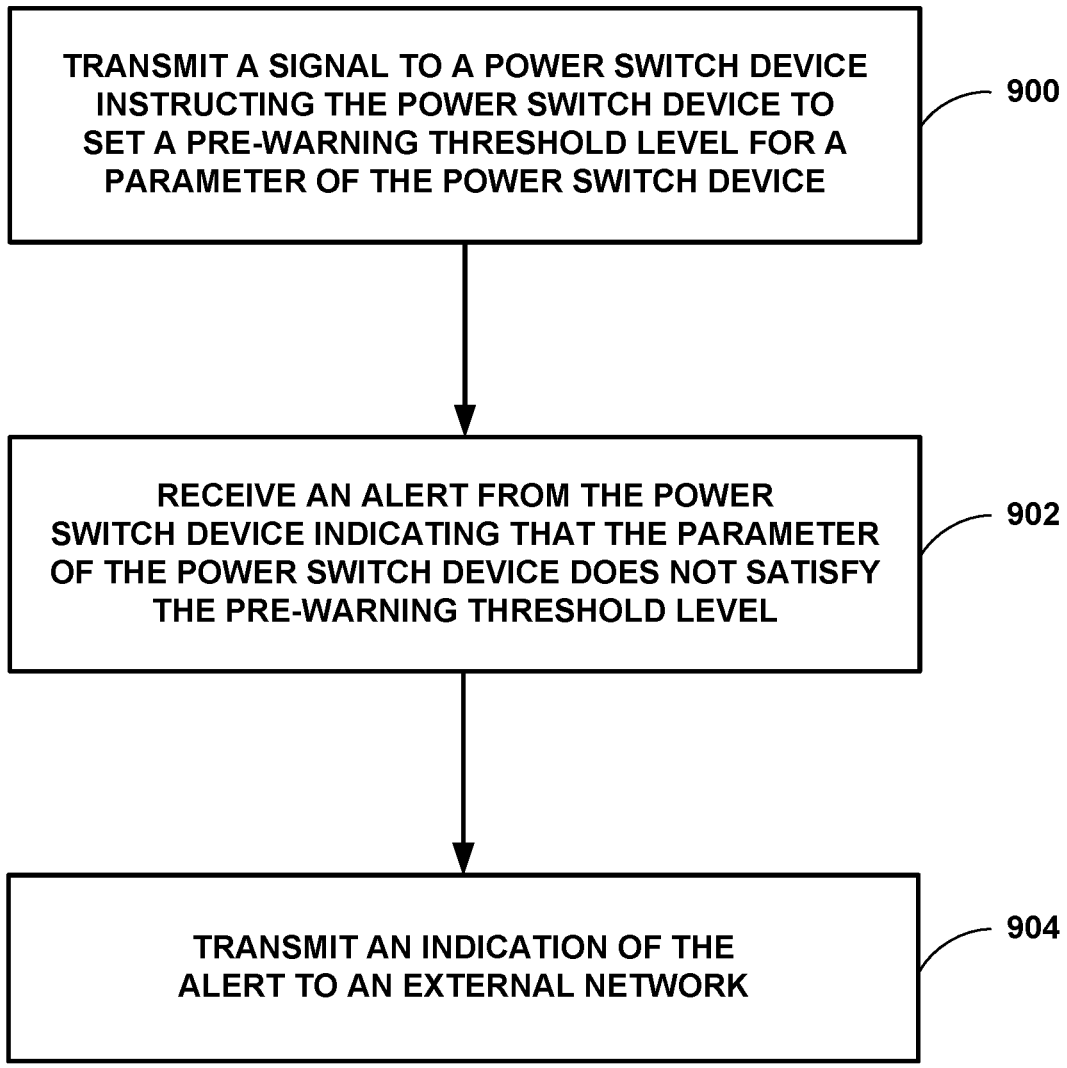
FIG. 9 is a flow diagram illustrating example techniques for instructing a power switch device or a gate driver device to set a pre-warning threshold level for a parameter of a power switch, in accordance with the techniques of this disclosure.

FIG. 9 is a flow diagram illustrating example techniques for instructing a device to set a pre-warning threshold level for a parameter of a power switch, in accordance with the techniques of this disclosure. Controller 150 shown in FIG. 1 will be described as performing the techniques of the example shown in FIG. 9, but other components, devices, and systems (e.g., device 100) may perform similar functionality in other examples.

In the example shown in FIG. 9, controller 150 transmits a signal to device 100 instructing device 100 to set a pre-warning threshold level for a parameter of device 100 (900). Controller 150 may be configured to transmit a digital signal indicating a magnitude for one or more of the pre-warning threshold levels to device 100. By sending the pre-warning threshold signal to device 100, controller 150 can off-load at least some of the responsibility for monitoring the parameters of switch 110, so that controller 150 does not have to continuously check the parameter values of every device that is coupled to controller 150. Controller 150 can determine the magnitude of each threshold level based on a predefined value and/or based on communication from external network 190. In some examples, controller 150 may be configured to determine a magnitude of the pre-warning threshold level based on user input.

Controller 150 then receives an alert from device 100 indicating that a parameter of device 100 does not satisfy the pre-warning threshold level (902). Controller 150 may also receive the magnitude of the parameter value that crossed a threshold level from device 100. Controller 150 can store the alert and, in some examples, send a command to device 100 to begin reporting parameter values to controller 150. For example, device 100 may begin transmitting values for the parameter that crossed the threshold level back to controller 150 after transmitting the alert to device 100.

In response to determining that an alert has not been received from device 100, controller 150 may be configured to determine that the parameter values of switch 110 satisfy the respective pre-warning threshold levels. In other words, in response to determining that an alert has not been received from device 100, controller 150 may be configured to determine the pre-warning threshold levels have not been crossed.

In the example of FIG. 9, controller 150 transmits an indication of the alert to external network 190 (904). Controller 150 may be configured to send data to external network 190, where the data can indicate the number and type of alerts received by controller 150 from multiple devices in system 102. In some examples, controller 150 is configured to send commands to and receive alerts from multiple devices including device 100. In addition, controller 150 can store data indicating the alerts received from the devices. Each device in system 102 may include a respective switch and a respective memory for storing threshold levels for parameters of the switch.

This disclosure has attributed functionality to devices 100 and 200, logic 120 and 220, memory 140, 242, and 246, and distribution circuits 310, 314, 316, and 318. Devices 100 and 200, logic 120 and 220, memory 140, 242, and 246, and distribution circuits 310, 314, 316, and 318 may include processing circuitry such as one or more processors. Devices 100 and 200, logic 120 and 220, memory 140, 242, and 246, and distribution circuits 310, 314, 316, and 318 may include any combination of integrated circuitry, discrete logic circuitry, analog circuitry, such as one or more microprocessors, digital signal processors (DSPs), application specific integrated circuits (ASICs), and/or field-programmable gate arrays (FPGAs). In some examples, devices 100 and 200, logic 120 and 220, memory 140, 242, and 246, and distribution circuits 310, 314, 316, and 318 may include multiple components, such as any combination of one or more microprocessors, one or more DSPs, one or more ASICs, or one or more FPGAs, as well as other discrete or integrated logic circuitry, and/or analog circuitry.

The techniques described in this disclosure may also be encoded in instructions and data stored to a non-transitory computer-readable storage medium, such as memory 140, 242, and 246. Example non-transitory computer-readable storage media may include RAM, ROM, programmable ROM (PROM), erasable programmable ROM (EPROM), electronically erasable programmable ROM (EEPROM), flash memory, a hard disk, magnetic media, optical media, or any other computer readable storage devices or tangible computer readable media. The term "non-transitory" may indicate that the storage medium is not embodied in a carrier wave or a propagated signal. In certain examples, a non-transitory storage medium may store data that can, over time, change (e.g., in RAM or cache).

The following numbered examples demonstrate one or more aspects of the disclosure.

Example 1. A method includes storing, by a logic circuit to a memory, a pre-warning threshold level for a parameter of a power switch. The method also includes receiving, by the logic circuit, a signal from a controller and setting, by the logic circuit, the pre-warning threshold level in response to receiving the signal from the controller. The method further includes determining, by the logic circuit, that a magnitude of the parameter of the power switch does not satisfy the pre-warning threshold level. The method includes outputting, by the logic circuit, an alert to the controller in response to determining that the magnitude of the parameter does not satisfy the pre-warning threshold level.

Example 2. The method of example 1, further including storing a shutdown level to a non-volatile memory.

Example 3. The method of example 1 or example 2, further including determining that the parameter does not satisfy a shutdown level.

Example 4. The method of examples 1-3 or any combination thereof, further including deactivating the power switch in response to determining that the parameter does not satisfy a shutdown level.

Example 5. The method of examples 1-4 or any combination thereof, further including setting a shutdown level in response to receiving a second signal from the controller.

Example 6. The method of examples 1-5 or any combination thereof, wherein storing the pre-warning threshold level includes storing the pre-warning threshold level to a volatile memory.

Example 7. The method of examples 1-6 or any combination thereof, wherein the parameter comprises a current through the power switch.

Example 8. The method of examples 1-7 or any combination thereof, wherein the parameter comprises a voltage across the power switch.

Example 9. The method of examples 1-8 or any combination thereof, wherein the parameter comprises a temperature of the power switch.

Example 10. The method of examples 1-9 or any combination thereof, further including outputting the magnitude of the parameter of the power switch to the controller in response to determining that the magnitude of the parameter of the power switch does not satisfy the pre-warning threshold level.

Example 11. The method of examples 1-10 or any combination thereof, further including determining, in a second instance, that the magnitude of the parameter of the power switch satisfies the pre-warning threshold level.

Example 12. The method of examples 1-11 or any combination thereof, further including not outputting the magnitude of the parameter of the power switch to the controller in response to determining that the magnitude of the parameter of the power switch satisfies the pre-warning threshold level.

Example 13. The method of examples 1-12 or any combination thereof, further including refraining from outputting the alert to the controller in response to determining that the magnitude of the parameter satisfies the pre-warning threshold level.

Example 14. The method of examples 1-13 or any combination thereof, further including setting a second pre-warning threshold level for a second parameter in response to receiving a second signal from the controller.

Example 15. The method of examples 1-14 or any combination thereof, further including outputting a second alert to the controller in response to determining that a magnitude of a second parameter does not satisfy a second pre-warning threshold level.

Example 16. The method of examples 1-15 or any combination thereof, further including setting a third pre-warning threshold level for a third parameter in response to receiving a third signal from the controller.

Example 17. The method of examples 1-16 or any combination thereof, further including outputting a third alert to the controller in response to determining that a magnitude of a third parameter does not satisfy a third pre-warning threshold level.

Example 18. The method of examples 1-17 or any combination thereof, wherein determining that the magnitude of the parameter of the power switch does not satisfy the pre-warning threshold level includes determining that a magnitude of a signal received from a sensing circuit or from a sensor does not satisfy the pre-warning threshold level.

Example 19. The method of examples 1-18 or any combination thereof, further including storing lower and upper pre-warning threshold levels to the memory.

Example 20. The method of examples 1-19 or any combination thereof, further including determine that the magnitude of the parameter of the power switch satisfies the pre-warning threshold levels by determining that the magnitude of the parameter is greater than or equal to the lower pre-warning threshold level and is less than or equal to the upper pre-warning threshold level.

Example 21. The method of examples 1-20 or any combination thereof, further including storing an updated value of the pre-warning threshold level in response to receiving an updated signal from the controller.

Example 22. The method of examples 1-21 or any combination thereof, further including activating the power switch to cause the power switch to connect a power supply to a load.

Example 23. A device including a memory configured to store a pre-warning threshold level for a parameter of a power switch. The device also includes a logic circuit configured to perform the method of examples 1-22 or any combination thereof.

Example 24. A device includes and memory configured to store a pre-warning threshold level for a parameter of the power switch. The device also includes a logic circuit configured to receive a signal from a controller and set the pre-warning threshold level in response to receiving the signal from the controller. The logic circuit is also configured to determine that a magnitude of the parameter of the power switch does not satisfy the pre-warning threshold level. The logic circuit is further configured to output an alert to the controller in response to determining that the magnitude of the parameter does not satisfy the pre-warning threshold level.

Example 25. The device of example 23 or example 24, further including the power switch as part of the device.

Example 26. The device of examples 23-25 or any combination thereof, wherein the power switch is separate from the device.

Example 27. The device of examples 23-26 or any combination thereof, further including a gate driver configured to activate the power switch based on control signals received from the logic circuit.

Example 28. The device of examples 23-27 or any combination thereof, further including a non-volatile memory configured to store a shutdown level.

Example 29. The device of examples 23-28 or any combination thereof, further including a volatile memory configured to store the pre-warning threshold level for the parameter of the power switch.

Example 30. The device of examples 23-29 or any combination thereof, further including a single housing at least partially enclosing the power switch, the memory, and the logic circuit.

Example 31. The device of examples 23-30 or any combination thereof, further including a single housing at least partially enclosing a gate driver, the memory, and the logic circuit.

Example 32. The device of examples 23-31 or any combination thereof, further including a single semiconductor die, wherein the power switch, the memory, and the logic circuit are integrated into a single semiconductor die.

Example 33. The device of examples 23-32 or any combination thereof, wherein the power switch, the memory, and the logic circuit are integrated into a single package.

Example 34. A system including a power device configured to control a power switch. The power device includes a memory configured to store a pre-warning threshold level for a parameter of a power switch. The device also includes a logic circuit configured to perform the method of examples 1-22 or any combination thereof. The system further includes a microcontroller configured to transmit a signal to the power device instructing the logic circuit to set the pre-warning threshold level.

Example 35. A system including a power device configured to control a power switch, the power device including a logic circuit and a memory configured to store a pre-warning threshold level for a parameter of the power switch. The system also includes a microcontroller configured to transmit a signal to the power device instructing the logic circuit to set the pre-warning threshold level. The logic circuit is configured to set the pre-warning threshold level in response to receiving the signal from the microcontroller. The logic circuit is also configured to determine that a magnitude of the parameter of the power switch does not satisfy the pre-warning threshold level. The logic circuit is further configured to output an alert to the microcontroller in response to determining that the magnitude of the parameter does not satisfy the pre-warning threshold level.

Example 36. The system of examples 34-35 or any combination thereof, further including a PCB, where the power device and the microcontroller are mounted on the PCB.

Example 37. The system of examples 34-36 or any combination thereof, wherein the microcontroller is configured to instruct the logic circuit to reduce the pre-warning threshold level in response to determining that the microcontroller has not received the alert from the power device.

Example 38. The system of examples 34-37 or any combination thereof, further including a plurality of power devices, wherein the microcontroller is configured to transmit a respective signal to each respective power device instructing the respective power device to set a respective pre-warning threshold level for the parameter of the respective power device.

Example 39. The system of examples 34-38 or any combination thereof, wherein the microcontroller is configured to transmit, in response to receiving the alert, a second signal indicating the alert to an external network for comparison of multiple systems that each include a respective microcontroller and a respective power device.

Example 40. The system of examples 34-39 or any combination thereof, wherein the microcontroller is configured to receive a third signal from an external network, the third signal including an instruction to set the pre-warning threshold level to a new value.

Example 41. The system of examples 34-40 or any combination thereof, wherein the microcontroller configured to transmit, in response to receiving a third signal from an external network, a fourth signal to the power device instructing the logic circuit to set the pre-warning threshold level to a new value.

Example 42. The system of examples 34-41 or any combination thereof, wherein the new value is determined based on analysis of data received by the external network from a fleet of vehicles including a first vehicle, wherein the system is configured to be installed on the first vehicle.

Example 43. A device includes a computer-readable medium having executable instructions stored thereon, configured to be executable by processing circuitry for causing the processing circuitry to perform the method of examples 1-22 or any combination thereof.

Example 44. A system includes means for performing the method of examples 1-22 or any combination thereof.

Various examples of the disclosure have been described. Any combination of the described systems, operations, or functions is contemplated. These and other examples are within the scope of the following claims.

What is claimed is:

1. A device comprising:
   memory configured to store a pre-warning threshold level for a parameter of a power switch; and
   a logic circuit configured to:
      receive a signal from a controller;
      set the pre-warning threshold level in response to receiving the signal from the controller;
      determine that a magnitude of the parameter of the power switch does not satisfy the pre-warning threshold level; and
      output an alert to the controller in response to determining that the magnitude of the parameter does not satisfy the pre-warning threshold level.

2. The device of claim 1,
   wherein the memory comprises non-volatile memory configured to store a shutdown level,
   wherein the logic circuit is configured to:
      determine that the parameter does not satisfy the shutdown level; and
      deactivate the power switch in response to determining that the parameter does not satisfy the shutdown level.

3. The device of claim 2,
   wherein the signal is a first signal,
   wherein the logic circuit is configured to:
      receive a second signal from the controller; and
      set the shutdown level in response to receiving the second signal from the controller.

4. The device of claim 1, wherein the memory comprises volatile memory configured to store the pre-warning threshold level for the parameter of the power switch.

5. The device of claim 1, wherein the parameter comprises a current through the power switch, a voltage across the power switch, or a temperature of the power switch.

6. The device of claim 1, wherein the logic circuit is configured to:
   determine, in a first instance, that the magnitude of the parameter of the power switch does not satisfy the pre-warning threshold level;
   output the magnitude of the parameter of the power switch to the controller in response to determining that the magnitude of the parameter of the power switch does not satisfy the pre-warning threshold level;
   determine, in a second instance, that the magnitude of the parameter of the power switch satisfies the pre-warning threshold level; and
   not output the magnitude of the parameter of the power switch to the controller in response to determining that the magnitude of the parameter of the power switch satisfies the pre-warning threshold level.

7. The device of claim 1, wherein the logic circuit is configured to:
   determine, in a first instance, that the magnitude of the parameter of the power switch does not satisfy the pre-warning threshold level;
   determine, in a second instance, that the magnitude of the parameter of the power switch satisfies the pre-warning threshold level; and
   refrain from outputting the alert to the controller in response to determining that the magnitude of the parameter satisfies the pre-warning threshold level.

8. The device of claim 1,
   wherein the pre-warning threshold level is a first pre-warning threshold level for a first parameter of the power switch,
   wherein the alert is a first alert,
   wherein the signal is a first signal,
   wherein the memory is further configured to store a second pre-warning threshold level for a second parameter of the power switch, and
   wherein the logic circuit is configured to:
      receive a second signal from the controller;
      set the second pre-warning threshold level in response to receiving the second signal from the controller;

determine that a magnitude of the second parameter of the power switch does not satisfy the second pre-warning threshold level; and
output a second alert to the controller in response to determining that the magnitude of the second parameter does not satisfy the second pre-warning threshold level.

9. The device of claim 8,
wherein the memory is further configured to store a third pre-warning threshold level for a third parameter of the power switch, and
wherein the logic circuit is configured to:
receive a third signal from the controller; and
set the third pre-warning threshold level in response to receiving the third signal from the controller;
determine that a magnitude of the third parameter of the power switch does not satisfy the third pre-warning threshold level; and
output a third alert to the controller in response to determining that the magnitude of the third parameter does not satisfy the third pre-warning threshold level.

10. The device of claim 1,
wherein the signal is a first signal,
wherein the device further comprises a sensing circuit configured to output a second signal indicating the parameter of the power switch, and
wherein the logic circuit is configured to:
receive the second signal from the sensing circuit; and
determine that the magnitude of the parameter of the power switch does not satisfy the pre-warning threshold level by at least determining that a magnitude of the second signal does not satisfy pre-warning threshold level.

11. The device of claim 1,
wherein the pre-warning threshold level is an upper pre-warning threshold level,
wherein the alert is a first alert,
wherein the signal is a first signal,
wherein the memory is further configured to store a lower pre-warning threshold level for a parameter of the power switch,
wherein the logic circuit is configured to:
determine that the magnitude of the parameter of the power switch does not satisfy the upper pre-warning threshold level by at least determining that the magnitude of the parameter of the power switch is greater than the upper pre-warning threshold level;
receive a second signal from the controller;
set the lower pre-warning threshold level in response to receiving the second signal from the controller;
determine that a magnitude of the parameter of the power switch does not satisfy the lower pre-warning threshold level by at least determining that the magnitude of the parameter of the power switch is less than the lower pre-warning threshold level; and
output a second alert to the controller in response to determining that the magnitude of the parameter does not satisfy the lower pre-warning threshold level.

12. The device of claim 1, further comprising a single housing at least partially enclosing the power switch, the memory, and the logic circuit.

13. The device of claim 1, wherein the power switch, the memory, and the logic circuit are integrated into a single semiconductor die.

14. The device of claim 1, wherein the power switch, the memory, and the logic circuit are integrated into a single package.

15. The device of claim 1, wherein the logic circuit is configured to activate the power switch to cause the power switch to connect a power supply to a load.

16. A method comprising:
storing, by a logic circuit to a memory, a pre-warning threshold level for a parameter of a power switch;
receiving, by the logic circuit, a signal from a controller;
setting, by the logic circuit, the pre-warning threshold level in response to receiving the signal from the controller;
determining, by the logic circuit, that a magnitude of the parameter of the power switch does not satisfy the pre-warning threshold level; and
outputting, by the logic circuit, an alert to the controller in response to determining that the magnitude of the parameter does not satisfy the pre-warning threshold level.

17. A system comprising:
a power device configured to control a power switch, the power device comprising:
memory configured to store a pre-warning threshold level for a parameter of a power switch; and
a logic circuit; and
a microcontroller configured to transmit a signal to the power device instructing the logic circuit to set the pre-warning threshold level,
wherein the logic circuit is configured to:
set the pre-warning threshold level in response to receiving the signal from the microcontroller;
determine that a magnitude of the parameter of the power switch does not satisfy the pre-warning threshold level; and
output an alert to the microcontroller in response to determining that the magnitude of the parameter does not satisfy the pre-warning threshold level.

18. The system of claim 17, further comprising a printed circuit board (PCB),
wherein the microcontroller is mounted on the PCB, and
wherein the power device is mounted on the PCB.

19. The system of claim 17,
wherein the signal is a first signal, and
wherein the microcontroller is configured to:
determine that the microcontroller has not received the alert from the power device; and
transmit a second signal to the power device instructing the logic circuit to reduce the pre-warning threshold level in response to determining that the microcontroller has not received the alert from the power device.

20. The system of claim 17, further comprising a plurality of power devices,
wherein the microcontroller is configured to transmit a respective signal to each respective power device instructing the respective power device to set a respective pre-warning threshold level for the parameter of the respective power device, and
wherein each power device of the plurality of power devices comprises:
a respective power switch; and
a respective memory configured to store a respective pre-warning threshold level for the parameter of the respective power switch.

21. The system of claim 17,
wherein the signal is a first signal, and wherein the microcontroller is configured to transmit, in response to receiving the alert, a second signal indicating the alert to an external network for comparison of multiple systems that each include a respective microcontroller and a respective power device.

22. The system of claim 21,
wherein the microcontroller is configured to receive a third signal from the external network, the third signal including an instruction to set the pre-warning threshold level to a new value,
wherein the microcontroller configured to transmit, in response to receiving the third signal, a fourth signal to the power device instructing the logic circuit to set the pre-warning threshold level to the new value, and
wherein the logic circuit is configured to set the pre-warning threshold level to the new value in response to receiving the fourth signal from the microcontroller.

23. The system of claim 22,
wherein the new value is determined based on analysis of data received by the external network from a fleet of vehicles including a first vehicle, and
wherein the system is configured to be mounted onboard the first vehicle.

\* \* \* \* \*